US008779068B2

(12) United States Patent
Clapper et al.

(10) Patent No.: US 8,779,068 B2
(45) Date of Patent: Jul. 15, 2014

(54) AZIRIDINYL-CONTAINING COMPOUNDS

(75) Inventors: Jason D. Clapper, Lino Lakes, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 80 days.

(21) Appl. No.: 13/703,230

(22) PCT Filed: Jun. 20, 2011

(86) PCT No.: PCT/US2011/041052
§ 371 (c)(1),
(2), (4) Date: Dec. 10, 2012

(87) PCT Pub. No.: WO2012/005932
PCT Pub. Date: Jan. 12, 2012

(65) Prior Publication Data
US 2013/0090434 A1   Apr. 11, 2013

Related U.S. Application Data

(60) Provisional application No. 61/359,488, filed on Jun. 29, 2010.

(51) Int. Cl.
C08F 8/30 (2006.01)
C08F 26/06 (2006.01)
C08F 20/02 (2006.01)
C08F 20/62 (2006.01)

(52) U.S. Cl.
USPC ............. 525/375; 525/329.7; 525/326.7; 526/258

(58) Field of Classification Search
USPC ............. 525/375, 329.7, 326.7; 526/258
See application file for complete search history.

(56) References Cited

U.S. PATENT DOCUMENTS

| | | | |
|---|---|---|---|
| 2,390,165 A | 12/1945 | Orthner | |
| 2,507,837 A | 5/1950 | Tadych | |
| RE24,906 E | 12/1960 | Ulrich | |
| 3,475,388 A * | 10/1969 | Yocum | 525/377 |
| 3,507,837 A * | 4/1970 | Hidinger, Jr. | 528/336 |
| 4,070,354 A * | 1/1978 | Dick et al. | 548/967 |
| 4,619,979 A | 10/1986 | Kotnour | |
| 4,843,134 A | 6/1989 | Kotnour | |
| 5,057,366 A | 10/1991 | Husman | |
| 5,106,993 A * | 4/1992 | Kania | 548/967 |
| 5,115,035 A * | 5/1992 | Shiraki et al. | 525/314 |
| 5,637,646 A | 6/1997 | Ellis | |
| 5,712,331 A * | 1/1998 | Ryang | 523/400 |
| 5,804,610 A | 9/1998 | Hamer | |
| 5,986,011 A | 11/1999 | Ellis | |
| 6,294,249 B1 | 9/2001 | Hamer | |
| 6,734,256 B1 | 5/2004 | Everaerts | |
| 6,777,079 B2 | 8/2004 | Zhou | |
| 6,893,718 B2 | 5/2005 | Melancon | |
| 7,255,920 B2 | 8/2007 | Everaerts | |
| 7,385,020 B2 | 6/2008 | Anderson | |
| 7,393,901 B1 * | 7/2008 | Filiatrault et al. | 525/222 |
| 7,691,437 B2 | 4/2010 | Ellis | |
| 7,893,179 B2 | 2/2011 | Anderson | |
| 7,927,703 B2 | 4/2011 | Xia | |
| 7,968,661 B2 | 6/2011 | Ellis | |
| 2008/0200587 A1 | 8/2008 | Filiatrault | |
| 2010/0227969 A1 | 9/2010 | Zhu | |

FOREIGN PATENT DOCUMENTS

| | | |
|---|---|---|
| DE | 836353 | 4/1952 |
| DE | 753128 | 11/1952 |
| EP | 0265091 | 4/1988 |
| JP | 2004331775 | 11/2004 |
| WO | WO 00/39233 | 7/2000 |
| WO | WO 2010/104645 | 9/2010 |
| WO | WO 2012/005814 | 1/2012 |

OTHER PUBLICATIONS

Babenkova, "New Reactive Oligomers and Monomers Derived from Ethylenimine", Journal of Applied Chemistry of the USSR, Aug. 1967, vol. 40, pp. 1715-1719. (Institute of Macromolecular Compounds, Academy of Sciences of the USSR. Translated from Zhurnal Prikladnoi Khimii, vol. 40, No. 8, pp. 1783-1788, Aug. 1967. Original article submitted Jul. 7, 1965.).
Baumert, "Carboxy-terminated homo- and copolymers of styrene using dicarboxylic acid-functional azo initiator and 2,2,6,6-tetramethyl-1-piperidyloxyl (TEMPO)", Macromolecular Rapid Communication, 1997, vol. 18, pp. 787-794.
Bestian, "Über einige Reaktionen des Äthylen-imins", Justus Liebigs Annalen der Chemie, Feb. 1950, vol. 566, No. 2, pp. 210-244.
Dufils, "Intermolecular Radical Addition of Alkoxyamines onto Olefins: An Easy Access to Advanced Macromolecular Architectures Precursors", Polymer, Aug. 24, 2007, vol. 48, No. 18, pp. 5219-5225.
Kadorkina, "α,ω-Bis-N-Aziridinoalkanes", Bulletin of the Academy of Sciences of the USSR, Apr. 1991, vol. 40, pp. 780-783. [N. N. Semenov Institute of Chemical Physics, Academy of Sciences of the USSR, Moscow. Translated from Izvestiya Akademii Nauk SSSR, Seriya Khimicheskaya, No. 4, pp. 882-885, Apr. 1991. Original article submitted May 25, 1990 (4 pages).].
Kobayashi, "Synthesis of Well-defined Polymers End-functionalized with Crosslinkable Aziridine Groups by Living Anionic Polymerization", Journal of Polymer Science: Part A: Polymer Chemistry, 2005, vol. 43, pp. 4126-4135.
Leenen, "Microwave-assisted Nitroxide-mediated Polymerization of Alkyl Acrylates", e-Polymers, 2005, No. 71, pp. 1-9.
Messerschmidt, "Synthesis of Partially Protected Block Copolymers Based on 4-Hydroxystyrene Using NMRP and a Sequence of Polymer Analogous Reactions", Macromolecules, Apr. 22, 2008, vol. 41, No. 8, pp. 2821-2831.
International Search Report for PCT/US2011/041052, 3 pages.

* cited by examiner

*Primary Examiner* — Kara Boyle
(74) *Attorney, Agent, or Firm* — Jean A. Lown

(57) ABSTRACT

Compounds are described that have both an aziridinyl group as well as a polymeric group. Methods of making these compounds are also described. The aziridinyl group of the compound can be reacted with an acidic group on a second compound resulting in the opening of the aziridinyl ring and the attachment of the polymeric group to the second compound.

15 Claims, No Drawings

AZIRIDINYL-CONTAINING COMPOUNDS

TECHNICAL FIELD

Compounds are described that have an aziridinyl group as well as a polymeric group.

BACKGROUND

Bis-aziridine compounds have been used as crosslinking agents in various polymerization reactions. Such compounds are described, for example, in U.S. Pat. No. 6,893,718 (Melancon et al.), German Patent No. 836,353, in an article of Bestian (*J. Lieb. Ann. Chem.*, 566, 210-244 (1950)), in an article of Babenkova (*J. of Applied Chemistry of the USSR*, 40, 1715-1719 (1967)), and in an article of Kadorkina et al. (*Bulletin of the Academy of Sciences of the USSR*, 40, 780-783 (1991)).

Carboxyl-terminated polymers have been prepared. These are described, for example, in an article of Baumert et al. (*Macromol. Rapid Commun.*, 18, 787-794 (1997)).

Some aziridyl-terminated polymers have been prepared as described, for example, in an article of Kobayashi et al. (*Journal of Polymer Science: Part A: Polymer Chemistry*, 43, 4126-4135 (2005)), Japanese Patent Publication JP4294369B2 (Kobayashi et al.), and European Patent Publication EP0265091A1 (Hertier et al.).

SUMMARY

Compounds are described that have both an aziridinyl group as well as a polymeric group. Methods of making these compounds are also described. The aziridinyl group of the compound can be reacted with an acidic group on a second compound resulting in the opening of the aziridinyl ring and the attachment (e.g., grafting) of the polymeric group to the second compound.

In a first aspect, a compound is provided of Formula (I).

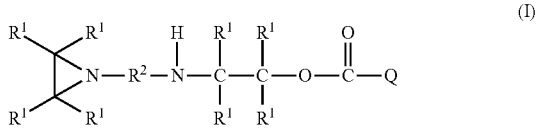

In this formula, each $R^1$ is independently hydrogen or an alkyl. The group $R^2$ is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl. Group Q is a polymeric group (i.e., first polymeric group) that is a polymerized product of a monomer composition that includes at least one ethylenically unsaturated monomer.

In another aspect, a method of preparing a compound of Formula (I) is provided. The method includes providing a carboxyl-terminated polymer of Formula (II).

Q-(CO)—OH   (II)

The group Q in Formula (II) is a polymeric group that is a polymerized product of a monomer composition that includes at least one ethylenically unsaturated monomer. The method further includes reacting the carboxyl-terminated polymer of Formula (II) with a bis-aziridine compound of Formula (III).

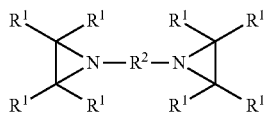

Each $R^1$ group in Formula (III) is independently hydrogen or an alkyl. The group $R^2$ is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl.

DETAILED DESCRIPTION

Compounds having a single aziridinyl group plus a first polymeric group are described. These compounds can be reacted with a second compound that has one or more acidic groups such as carboxyl groups. Such a reaction can result in the opening of the aziridinyl ring and in the formation of an attachment group that connects the first polymeric group to the second compound.

The term "a", "an", and "the" are used interchangeably with "at least one" to mean one or more of the elements being described.

The recitation of any numerical range by endpoints is meant to include the endpoints of the range, all numbers within the range, and any narrower range within the stated range.

The term "aziridinyl" refers to a monovalent three-member ring structure of formula

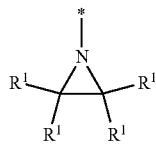

where each $R^1$ is independently hydrogen or an alkyl (e.g., an alkyl having 1 to 10 carbon atoms, 1 to 6 carbon atoms, or 1 to 3 carbon atoms). The asterisk indicates the position of attachment of the aziridinyl group to the remainder of the compound.

As used herein, the term "polymer" and "polymeric" refer to a material that is a homopolymer, copolymer, terpolymer, or the like. Likewise, the terms "polymerize" and "polymerization" refer to the process of making a homopolymer, copolymer, terpolymer, or the like. The terms "copolymer" and "copolymeric" can be used to refer to a polymer prepared using two or more different monomers.

The term "alkyl" refers to a monovalent group that is a radical of an alkane and includes groups that are linear, branched, cyclic, bicyclic, or a combination thereof. The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, iso-propyl, n-butyl, isobutyl, tert-butyl, n-pentyl, n-hexyl, cyclohexyl, n-heptyl, n-octyl, ethylhexyl, and isobornyl.

The term "heteroalkyl" refers to a monovalent group is an alkyl group in which one or more —$CH_2$— groups are replaced with thio, oxy, or —NRa— where Ra is hydrogen or alkyl. The heteroalkyl can be linear, branched, cyclic, bicyclic, or a combination thereof and can include up to 60 carbon atoms and up to 40 heteroatoms. In some embodiments, the heteroalkyl includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "alkylene" refers to a divalent group that is a radical of an alkane. The alkylene can be straight-chained, branched, cyclic, bicyclic, or a combination thereof. The alkylene typically has 1 to 30 carbon atoms. In some embodiments, the alkylene contains 1 to 20, 1 to 10, 1 to 6, or 1 to 4 carbon atoms. The radical centers of the alkylene can be on the same carbon atom (i.e., an alkylidene) or on different carbon atoms.

The term "heteroalkylene" refers to a divalent alkylene having one or more —$CH_2$— groups replaced with a thio, oxy, or —$NR^a$— where $R^a$ is hydrogen or alkyl. The heteroalkylene can be linear, branched, cyclic, bicyclic, or a combination thereof and can include up to 60 carbon atoms and up to 40 heteroatoms. In some embodiments, the heteroalkylene includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "aryl" refers to a monovalent group that is aromatic and carbocyclic. The aryl can have one to five rings that are connected to or fused to the aromatic ring. The other ring structures can be aromatic, non-aromatic, or a combination thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or a combination thereof. At least one ring is aromatic and any additional rings can be aromatic, non-aromatic, or a combination thereof. In some embodiments, the arylene group has up to 5 rings, up to 4 rings, up to 3 rings, up to 2 rings, or one aromatic ring. For example, the arylene group can be phenylene, biphenylene, terphenylene, fluorenylene, or naphthalene.

The term "heteroarylene" refers to a divalent group that is aromatic and heterocyclic. That is, the heteroarylene includes at least one heteroatom in an aromatic ring having 5 or 6 members. Suitable heteroatoms are typically oxy, thio, or —$NR^3$— where $R^3$ is hydrogen or an alkyl. The group can have one to five rings that are connected, fused, or a combination thereof. At least one ring is heteroaromatic and any other rings can be aromatic, non-aromatic, heterocyclic, carbocyclic, or a combination thereof. In some embodiments, the heteroarylene has up to 5 rings, up to 4 rings, up to 3 rings, up to 2 rings, or one ring. Examples of heteroarylene groups include, but are not limited to, triazine-diyl, pyridine-diyl, pyrimidine-diyl, pyridazine-diyl, and the like.

The term "alkoxy" refers to a monovalent group of formula —OR where R is an alkyl group.

The term "aralkyl" refers to a monovalent group that is an alkyl group substituted with an aryl group.

The term "aryloxy" refers to a monovalent group of formula —OAr where Ar is an ayrl group.

The term "aryloxyalkyl" refers to a monovalent group that is an alkyl substituted with an aryloxy group.

The term "carbonyl" refers to a divalent group of formula —(CO)— where the carbon is attached to the oxygen with a double bond.

The term "carbonyloxy" are used interchangeably to refer to a divalent group —(CO)O—. The term "carboxyl" refers to the group —(CO)OH and/or the salt thereof.

The term "carbonylimino" refers to a divalent group of formula —(CO)$NR^b$— where $R^b$ is hydrogen, alkyl, aryl, aralkyl, acyl, alkylsulfonyl, or arylsulfonyl.

The term "oxy" refers to a divalent group —O—.

The term "(meth)acrylic acid" refers to both acrylic acid and methacrylic acid. Likewise, the term "(meth)acrylate" refers to both an acrylate (i.e., acrylate ester) and a methacrylate (i.e., methacrylate ester) and the term "(meth)acrylamide" refers to both an acrylamide and a methacrylamide.

The compounds having an aziridinyl group plus a first polymeric group are of Formula (I).

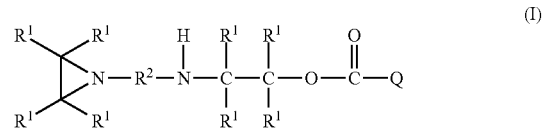

(I)

In this formula, each $R^1$ is independently hydrogen or an alkyl. The $R^2$ group is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl (e.g., an alkyl having 1 to 10 carbon atoms, 1 to 6 carbon atoms, 1 to 4 carbon atoms, or 1 to 3 carbon atoms). Group Q is a polymeric group that is a polymerized product of a monomer composition that includes at least one ethylenically unsaturated monomer.

Suitable alkyl groups for $R^1$ typically have 1 to 10 carbon atoms, 1 to 6 carbon atoms, 1 to 4 carbon atoms, or 1 to 3 carbon atoms. In many embodiments, the azirdinyl group has at least one $R^1$ group that is hydrogen and at least one $R^1$ group that is an alkyl. In some more specific embodiments, one of the $R^1$ groups on the azridinyl ring is methyl with the remaining $R^1$ groups being hydrogen.

The divalent group $R^2$ contains at least one alkylene, heteroalkylene, arylene, heteroarylene, or a combination thereof. In addition to at least one of these groups, $R^2$ can further include an oxy, carbonyl, carbonyloxy, carbonylimino, —$NR^3$—, or a combination thereof. That is, in some embodiments, $R^2$ is an alkylene, a heteroalkylene, an arylene, a heteroarylene, or a combination thereof. In other embodiments, $R^2$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof. The oxy, carbonyl, carbonyloxy, carbonylimino, —$NR^3$— or a combination thereof can be used, for example, (1) to link together two or more groups selected from alkylene, heteroalkylene, arylene, and heteroarylene, (2) to attach an alkylene, heteroalkylene, arylene, or heteroarylene to the aziridinyl group, to the polymeric group, or to both the aziridinyl group and the polymeric group, or (3) both (1) and (2).

In some embodiments, $R^2$ includes a first group that is an alkylene, heteroalkylene, arylene, or heteroarylene connected to a second group that is an alkyene, heteroalkylene, arylene, or heteroarylene using a first linking group that is an oxy, carbonyl, carbonyloxy, carbonylimino, —$NR^3$—, or a combination thereof. The second group can be further connected to a third group that is an alkylene, heteroalkylene, arylene, or heteroarylene using a second linking group that is an oxy, carbonyl, carbonyloxy, carbonylimino, —NR³— or a combination thereof. The third group can be further connected to a fourth group that is an alkylene, heteroalkylene, arylene, or heteroarylene using a third linking group that is an oxy, carbonyl, carbonyloxy, carbonylimino, —NR³—, or a combination thereof. Additional groups selected from an alkylene, heteroalkylene, arylene, and heteroarylene can be further connected using additional linking groups selected from an oxy, carbonyl, carbonyloxy, carbonylimino, —NR³—, or a combination thereof.

In other embodiments, R² includes a first group that is an alkylene, heteroalkylene, arylene, or heteroarylene that is positioned between two groups that are each selected from an oxy, carbonyl, carbonyloxy, carbonylimino, —NR³—, or a combination thereof. One of these groups is attached the polymeric group and the other is attached to the aziridinyl group. These two groups are typically the same but can be different.

In still other embodiments, two or more alkylene, heteroalkylene, arylene, or heteroarylene groups are positioned between two groups selected from oxy, carbonyl, carbonyloxy, carbonylimino, —NR³—, or a combination thereof. One of these groups is attached the polymeric group and the other is attached to the aziridinyl group. These two groups are typically the same but can be different. The two or more alkylene, heteroalkylene, arylene, or heteroarylene groups are typically connected to each other through an oxy, carbonyl, carbonyloxy, carbonylimino, —NR³— group, or a combination thereof.

Some compounds of Formula (I) are also compounds of Formula (Ia).

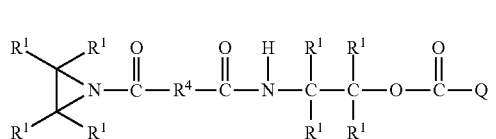

(Ia)

The group R² from Formula (I) is equal to —(CO)—R⁴—(CO)— in Formula (Ia). Group R⁴ is a divalent group that includes an alkylene, heteroalkylene, arylene, heteroarylene, or a combination thereof. Optionally, group R⁴ can further include an oxy, carbonyl, carbonyloxy, carbonylimino, —NR³—, or a combination thereof. Stated differently, in some embodiments, R⁴ is an alkylene, a heteroalkylene, an arylene, a heteroarylene, or a combination thereof. In other embodiments, R⁴ includes (a) at least one alkylene, heteroalkylene, arylene, heteroarylene, or a combination thereof plus (b) at least one oxy, carbonyl, carbonyloxy, carbonylimino, —NR³—, or a combination thereof.

As with the R² group in Formula (I), the R⁴ group in Formula (Ia) can include a first group that is an alkylene, heteroalkylene, arylene, or heteroarylene connected to a second group that is an alkyene, heteroalkylene, arylene, or heteroarylene using a first linking group that is an oxy, carbonyl, carbonyloxy, carbonylimino, —NR³—, or a combination thereof. The second group can be further connected to a third group that is an alkylene, heteroalkylene, arylene, or heteroarylene using a second linking group that is an oxy, carbonyl, carbonyloxy, carbonylimino, —NR³—, or a combination thereof. The third group can be further connected to a fourth group that is an alkylene, heteroalkylene, arylene, or heteroarylene using a third linking group that is an oxy, carbonyl, carbonyloxy, carbonylimino, —NR³—, or a combination thereof. Additional groups selected from an alkylene, heteroalkylene, arylene, and heteroarylene can be further connected using additional linking groups selected from an oxy, carbonyl, carbonyloxy, carbonylimino, —NR³—, or a combination thereof.

In some embodiments, the group R⁴ in Formula (Ia) is an alkylene, heteroalkylene, arylene, or heteroarylene. Exemplary alkylene groups have 1 to 30 carbon atoms, 1 to 20 carbon atoms, 1 to 12 carbon atoms, 1 to 6 carbon atoms, or 1 to 4 carbon atoms. Exemplary heteroalkylene groups have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms. Exemplary arylene groups include, but are not limited to, phenylene (e.g., meta-phenylene or para-phenylene) and biphenylene. Exemplary heteroarylenes include, but are not limited to, triazine-diyl, pyridine-diyl, pyrimidine-diyl, and pyridazine-diyl.

Some more specific compounds according to Formula (Ia) are of Formula (Ib) where R⁴ is an arylene.

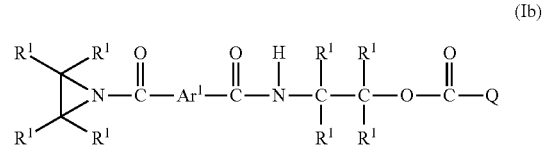

(Ib)

In some more specific compounds of Formula (Ib), the arylene is phenylene such as in Formula (Ic).

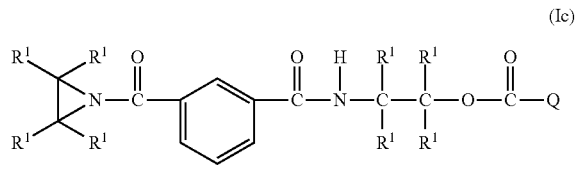

(Ic)

Other example compounds of Formula (Ia) are of Formula (Id).

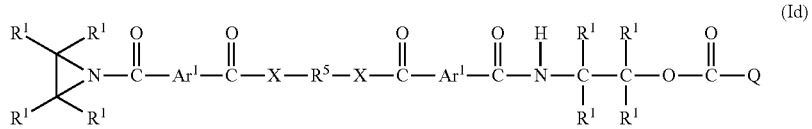

(Id)

In Formula (Id), the divalent group —Ar¹—(CO)—X—R⁵—X—(CO)—Ar¹— is equal to R⁴ in Formula (Ia) and the divalent group —(CO)—Ar¹—(CO)—X—R⁵—X—(CO)—Ar¹—(CO)— is equal to R² in Formula (I). Each group Ar¹ is an arylene and each group X is oxy or —NR³—. Group R⁵ is a divalent group that includes an alkylene or heteroalkylene, arylene, heteroarylene, or a combination thereof and that can further include an oxy, carbonyl, carbonyloxy, carbonylimino, —NR$^3$—, or a combination thereof. Stated differently, in some embodiments, R$^5$ is an alkylene, a heteroalkylene, an arylene, a heteroarylene, or a combination thereof. In other embodiments, R$^5$ includes (a) at least one alkylene, heteroalkylene, arylene, heteroarylene, or a combination thereof plus (b) at least one oxy, carbonyl, carbonyloxy, carbonylimino, —NR$^3$—, or a combination thereof.

As with both R$^2$ and R$^4$, group R$^5$ can include a first group that is an alkylene, heteroalkylene, arylene, or heteroarylene connected to a second group that is an alkylene, heteroalkylene, arylene, or heteroarylene using a first linking group that is an oxy, carbonyl, carbonyloxy, carbonylimino, —NR$^3$—, or a combination thereof. The second group can be further connected to a third group that is an alkylene, heteroalkylene, arylene, or heteroarylene using a second linking group that is an oxy, carbonyl, carbonyloxy, carbonylimino, —NR$^3$—, or a combination thereof. The third group can be further connected to a fourth group that is an alkylene, heteroalkylene, arylene, or heteroarylene using a third linking group that is an oxy, carbonyl, carbonyloxy, carbonylimino, —NR$^3$—, or a combination thereof. Additional groups selected from an alkylene, heteroalkylene, arylene, and heteroarylene can be further connected using additional linking groups selected from an oxy, carbonyl, carbonyloxy, carbonylimino, —NR$^3$—, or a combination thereof.

In some compounds of Formula (Id), Ar$^1$ is phenylene such as in Formula (Ie).

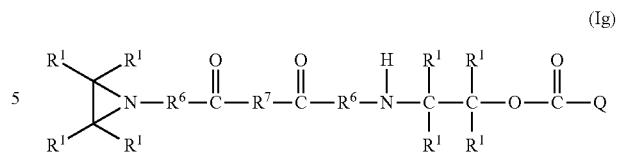

In Formula (Ig), the divalent group —R$^6$—(CO)—R$^7$—(CO)—R$^6$— is equal to group R$^2$ in Formula (I). Each R$^6$ is independently an alkylene having 1 to 10 carbon atoms, 1 to 6 carbon atoms, 1 to 4 carbon atoms, or 1 to 3 carbon atoms. Group R$^7$ is a divalent group that includes an alkylene, heteroalkylene, arylene, heteroarylene, or a combination thereof and that can further include an oxy, carbonyl, carbonyloxy, carbonylimino, —NR$^3$—, or a combination thereof. Stated differently, in some embodiments, R$^7$ is an alkylene, a heteroalkylene, an arylene, a heteroarylene, or a combination thereof. In other embodiments, R$^7$ includes (a) at least one alkylene, heteroalkylene, arylene, heteroarylene, or a combination thereof plus (b) at least one oxy, carbonyl, carbonyloxy, carbonylimino, —NR$^3$—, or a combination thereof.

As with R$^2$, R$^4$, or R$^5$, group R$^7$ can include a first group that is an alkylene, heteroalkylene, arylene, or heteroarylene connected to a second group that is an alkyene, heteroalkylene, arylene, or heteroarylene using a first linking group that is an oxy, carbonyl, carbonyloxy, carbonylimino, —NR$^3$—, or a combination thereof. The second group can be further

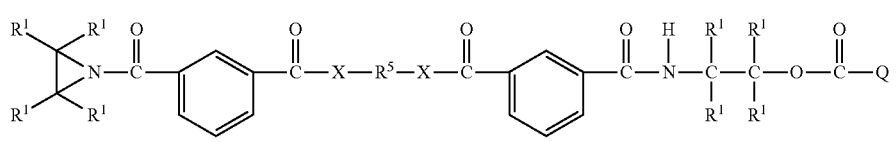

The groups R$^1$, X, R$^5$, and Q are the same as defined above for Formula (Id).

In some specific embodiments of Formula (Ie), the R$^5$ group is an alkylene or heteroalkylene. Suitable alkylene groups often have 1 to 30 carbon atoms, 1 to 20 carbon atoms, 1 to 12 carbon atoms, 1 to 10 carbon atoms, 1 to 6 carbon atoms, or 1 to 4 carbon atoms. Suitable heteroalkylene groups often have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms.

Other example compounds of Formula (Ia) are of (If).

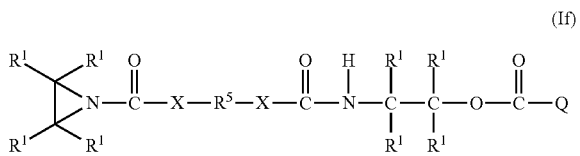

In Formula (If), the group —X—R$^5$—X— is equal to R$^4$ in Formula (Ia) and the group —(CO)—X—R$^5$—X—(CO)— is equal to R$^2$ in Formula (I). The groups X and R$^5$ are the same as defined above for Formula (Id). In some specific embodiments of Formula (If), each X is oxy or —NR$^3$— with the group R$^5$ being an alkylene or heteroalkylene.

Yet other example compounds of Formula (I) are of Formula (Ig).

connected to a third group that is an alkylene, heteroalkylene, arylene, or heteroarylene using a second linking group that is an oxy, carbonyl, carbonyloxy, carbonylimino, —NR$^3$—, or a combination thereof. The third group can be further connected to a fourth group that is an alkylene, heteroalkylene, arylene, or heteroarylene using a third linking group that is an oxy, carbonyl, carbonyloxy, carbonylimino, —NR$^3$—, or a combination thereof. Additional groups selected from an alkylene, heteroalkylene, arylene, and heteroarylene can be further connected using additional linking groups selected from an oxy, carbonyl, carbonyloxy, carbonylimino, —NR$^3$—, or a combination thereof.

Some compounds of Formula (Ig) are compounds of Formula (Ih).

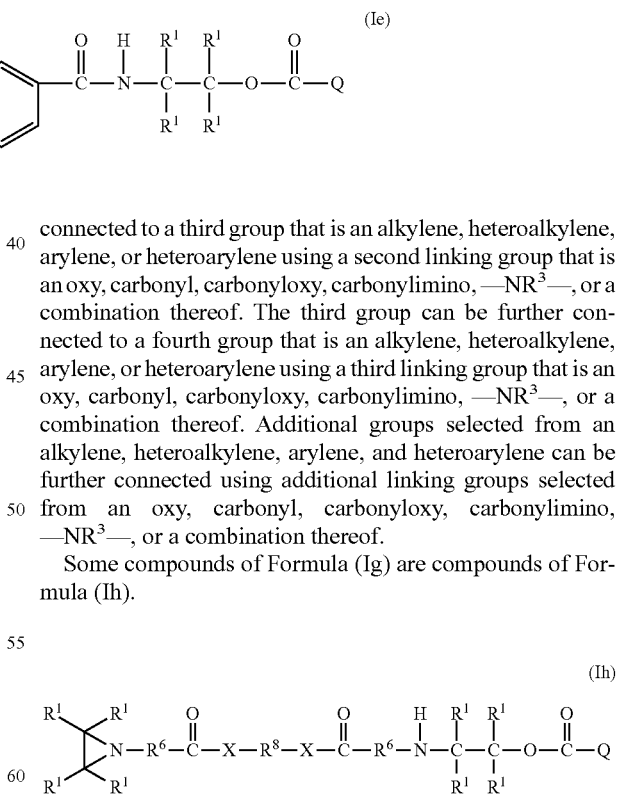

In Formula (Ih), the divalent group —X—R$^8$—X is equal to group R$^7$ in Formula (Ig). Each group X is independently oxy or —NR$^3$—. Group R$^8$ is a divalent group that includes an alkylene, heteroalkylene, arylene, heteroarylene, or a combination thereof and that can further include an oxy, carbonyl, carbonyloxy, carbonylimino, —NR³—, or a combination thereof. Stated differently, in some embodiments, R⁸ is an alkylene, heteroalkylene, arylene, heteroarylene, or a combination thereof. In other embodiments, R⁸ includes (a) at least one alkylene, heteroalkylene, arylene, heteroarylene, or a combination thereof plus (b) at least one oxy, carbonyl, carbonyloxy, carbonylimino, —NR³—, or a combination thereof.

Group R⁸ is an alkylene or heteroalkylene group and X is an oxy in some specific embodiments of Formula (Ih). Suitable alkylene groups often have 1 to 30 carbon atoms, 1 to 20 carbon atoms, 1 to 12 carbon atoms, 1 to 10 carbon atoms, 1 to 6 carbon atoms, or 1 to 4 carbon atoms. Suitable heteroalkylene groups often have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms.

All of the compounds of Formula (I) and (Ia) to (Ih) have a group Q, which is a polymeric group that is a polymerized product of a first monomer composition that includes at least one ethylenically unsaturated monomer. The polymerization reaction can be a free radical polymerization reaction or an anionic polymerization reaction.

Any suitable ethylenically unsaturated monomer can be used to form group Q. Suitable monomers include, but are not limited to, various (meth)acrylates (i.e., (meth)acrylate esters), (meth)acrylic acids, (meth)acrylamides, vinyls, or the like. In some embodiments, the polymeric group is a homopolymeric group in which all of the monomers used to form the polymeric group are the same. In other embodiments, the polymeric group is a random copolymer or a block copolymer.

In some embodiments, the polymeric group is formed from one or more (meth)acrylates. The (meth)acrylates are often In Formula (II).

(II)

In this formula, group R¹⁰ is hydrogen or methyl and group R⁹ is an alkyl, heteroalkyl, aryl, aralkyl, or aryloxyalkyl. Suitable alkyl groups often have 1 to 20 carbon atoms, 1 to 10 carbon atoms, 1 to 6 carbon atoms, or 1 to 4 carbon atoms. Suitable heteroalkyl groups often have 2 to 30 carbon atoms and 1 to 16 heteroatoms, 2 to 20 carbon atoms and 1 to 12 carbon atoms, 2 to 10 carbon atoms and 1 to 6 heteroatoms, or 2 to 6 carbon atoms and 1 to 4 heteroatoms. The alkyl and heteroalkyl groups can be linear, branched, cyclic, bicyclic, or a combination thereof. Suitable aralkyl groups often have 7 to 18 carbon atoms. An example is an alkyl group substituted with phenyl. Suitable aryloxyalkyl groups often have 7 to 18 carbon atoms. An example is an alkyl group substituted with an oxyphenyl. These monomers, when formed into a homopolymer, can have a wide range of glass transition temperatures.

The monomers can be selected that provide a desired glass transition temperature depending on a particular use of the compound of Formula (I). More specifically, polymeric groups with a glass transition temperature that is greater than or equal to 20° C. or higher tend to be thermoplastic. As used herein, the term "thermoplastic" refers to a polymeric material that flows when heated and then return to its original state when cooled to room temperature. The polymeric groups with a glass transition temperature that is less than 20° C. tend to be elastomeric. As used herein, the term "elastomeric" refers to a polymeric material that can be stretched to at least twice its original length and then retracted to approximately its original length upon release.

In some embodiments, the monomers of Formula (II) used to form the polymeric group Q are selected from n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methylbutyl acrylate, 4-methyl-2-pentyl acrylate, n-octyl acrylate, n-propyl acrylate, and n-octyl methacrylate. These monomers, when formed into a homopolymeric group, tend to have a glass transition temperature less than 20° C., less than 10° C., or less than 0° C.

In other embodiments, the monomers of Formula (II) used to form the polymeric group Q are selected from (meth)acrylates such as methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl (meth)acrylate, isobornylcyclohexyl acrylate, tetrahydrofurfuryl methacrylate, trifluoroethyl methacrylate, 1-adamantyl methacrylate, dicyclopentenyloxylethyl (meth)acrylate, dicyclopentanyl (meth)acrylate, and 3,3,5 trimethylcyclohexyl (meth)acrylate.

These monomers, when formed into a homopolymeric group, tend to have a glass transition temperature that is equal to at least 20° C., at least 30° C., at least 40° C., or at least 50° C.

Any of the (meth)acrylate monomers can be optionally substituted with a group such as an amino group, hydroxyl group, or epoxy group. The substituents tend to enhance the polarity of the monomers. Examples of (meth)acrylates with a hydroxyl substituent include, but are not limited to, 2-hydroxyethyl (meth)acrylate, 2-hydroxypropyl (meth)acrylate, and 4-hydroxylbutyl (meth)acrylate. Examples (meth)acrylates with an epoxy substituent include, but are not limited to, glycidyl (meth)acrylate. Examples of (meth)acrylates with an amino group include, but are not limited to, N,N-dialkyl (meth)acrylates such as dimethylaminoethyl (meth)acrylate.

The (meth)acrylates can also be an alkoxyalkyl (meth)acrylate or poly(alkoxyalkyl (meth)acrylate) such as, for example, 2-(2-ethoxyethoxy)ethyl (meth)acrylate, 2-ethoxyethyl (meth)acrylate, 2-methoxyethoxyethyl (meth)acrylate, 2-methoxyethyl (meth)acrylate, and polyethylene glycol mono(meth)acrylates. These tend to be polar molecules.

The polymeric group Q is typically prepared from non-acidic monomers. If group Q is prepared from a mixture of monomers, at least 90 weight percent, at least 95 weight percent, at least 97 weight percent, at least 98 weight percent, or at least 99 weight percent of the monomers do not have a carboxyl groups (i.e., monomers that are free of carboxyl groups). In some embodiments, all of the monomers in the monomer composition are free of carboxyl groups. If the content of acidic monomers is too great, it can be difficult to prepare a compound of Formula (I) with a single aziridinyl group.

Some specific Q groups are prepared from (meth)acrylates such as, for example, poly(benzyl methacrylate), poly(methyl methacrylate), poly(phenoxyethyl acrylate), and random or block poly(isobornyl acrylate-co-benzyl methacrylate).

Other suitable ethylenically unsaturated monomers for forming polymeric group Q are (meth)acrylamide, alkyl acrylamides such as t-butyl acrylamide, monoalkylaminoalkyl acrylamides such as methylaminoethyl acrylamide, dialkylaminoalkylacrylamides such as dimethylaminoethylacrylamide, and the like.

Still other suitable ethylenically unsaturated monomers that can be used to form polymeric group Q are various vinyl monomers such as, vinyl ether monomers, vinyl aryl monomers, vinyl heterocyclic monomers, vinyl ester monomers, and the like. Suitable vinyl ether monomers include, for example, vinyl methyl ether. Suitable vinyl aryl monomers include, but are not limited to, styrene, alpha-methyl styrene, alkyl substituted sytrenes (e.g., vinyl toluene, dimethylstytrene, ethylstyrene, isopropylstyrene, and tert-butylstyrene), and the like. Any of these vinyl aryl monomers optionally can be substituted with one or more groups selected from amino, hydroxyl, alkoxy, halo, and the like. Suitable vinyl heterocyclic monomers include, but are not limited to, 2-vinyl pyridine, 4-vinyl pyridine, and n-vinylcarpolactam. Suitable vinyl esters include, but are not limited to, vinyl acetate and vinyl proprionate. Monomers such as vinyl aryl monomers, vinyl heterocyclic monomers, and some vinyl ester monomers, when formed into a homopolymeric group, tend to have a glass transition temperature that is at least 30° C., at least 40° C., or at least 50° C.

Some specific polymeric Q groups are prepared from a vinyl monomer such as a vinyl aryl monomer, vinyl heterocyclic monomer, or a combination thereof. These Q groups can be homopolymers, random copolymers, or block copolymers. The block copolymers can have two or more blocks. Some block copolymers have a first block of poly(vinyl aryl monomer) and a second block of poly(vinyl heterocylic monomer). Some specific polymeric examples are poly(styrene), random poly(styrene-co-vinyl pyridine), and di-block poly(styrene-co-vinyl pyridine).

The polymeric Q group can have any suitable molecular weight. In many embodiments, the weight average molecular weight (Mw) is greater than the 5,000 grams/mole (i.e., 5,000 Daltons). For example, the weight average molecular weight can be greater than 7,500 grams/mole, greater than 10,000 grams/mole, greater than 12,000 grams/mole, greater than 15,000 grams/mole, or greater than 20,000 grams/mole. The weight average molecular weight is often up to 150,000 grams/mole, up to 120,000 grams/mole, up to 100,000 grams/mole, up to 80,000 grams/mole, up to 60,000 grams/mole, or up to 40,000 grams/mole. If the molecular weight is too great, the resulting compound of Formula (I) can have an unacceptably low concentration of the aziridinyl group based on the weight of the compound. That is, the weight percent of the compound attributable to the aziridinyl group may be unacceptable low compared to the weight percent of the compound attributable to the polymeric group.

Although the polymeric group can be formed by either anionic polymerization or free radical polymerization, free radical polymerization techniques are often used. The polymerization reaction typically occurs in the presence of an initiator. Although any known initiator can be used, the initiator is often an azo compound. Suitable azo compounds include, but are not limited to, 2,2'-azobis(isobutyronitrile) commercially available under the trade designation VAZO 64 from DuPont (Wilmington, Del.), 2,2'-azobis(2-methylbutyronitrile) commercially available under the trade designation VAZO 67 from DuPont, 2,2'-azobis(2,4-dimethylpentanenitrile) commercially available under the trade designation VAZO 52 from DuPont, and 4,4'-azobis(4-cyanovaleric acid). The use of a carboxyl-containing initiator such as 4,4'-azobis(4-cyanovaleric acid) is often preferred because such an initiator tends to increase the likelihood that the polymeric intermediate (Q-(CO)—OH) involved in the preparation of the compounds of Formula (I) has a carboxyl group. The initiator is typically added in an amount in the range of 0.01 to 5 weight percent, in the range of 0.05 to 3 weight percent, in the range of 0.05 to 2 weight percent, in the range of 0.05 to 1 weight percent, or in the range of 0.1 to 1 weight percent based on the weight of monomers in the monomer composition. The amount of initiator can be used to control the weight average molecular weight of the polymeric group Q. More polymeric chains are formed when greater amounts of the initiator are used. This leads to polymeric chains with lower weight average molecular weight. Conversely, fewer polymeric chains with a higher weight average molecular weight are formed with lesser amounts of initiator.

The monomer composition used to form the polymeric Q group can also include a chain transfer agent to control the molecular weight. Examples of useful chain transfer agents include, but are not limited to, carbon tetrabromide, alcohols, mercaptans, and mixtures thereof. The use of carboxyl-containing chain transfer agents such as, for example, 3-mercaptopropionic acid is often preferred. These carboxyl-containing chain transfer agent tend to increase the likelihood that the polymeric intermediate involved in the preparation of the compounds of Formula (I) has a carboxyl group.

Chain transfer agents can be used with most ethylenically unsaturated monomers. When a chain transfer agent is used, one end of the polymeric material is often a group derived from the initiator while the other end can be a group derived from the chain transfer agent. At least one of the initiator or chain transfer agent can be selected to provide acidic functionality (e.g., a carboxyl group). Using both an initiator and a chain transfer agent that include an acidic functionality tends to increase the likelihood that most polymeric chains will contain an acidic functionality.

Instead of a chain transfer agent, the monomer composition can include a nitroxide mediating agent such as, for example, 2,2,6,6-tetramethyl-1-piperidinyloxy (TEMPO) commercially available from Alfa Aesar (Ward Hill, Mass.), 1,1,3,3-tetraethyl-2,3-dihydro-1H-isoindolin-2-yloxyl, di-tert-butyl nitroxide, or 4-oxo-TEMPO commercially available from Alfa Aesar. The polymerization reaction is considered to be "living" or "controlled" and can be initiated and terminated as desired. The mechanism of control relies on the reversible coupling of the nitroxide mediating agent to the free radical on the active (i.e., propagating) polymer chain to form an alkoxy amine linkage. The addition of the nitroxide mediating agent makes the polymer chain dormant and unable to further propagate. At certain temperatures, however, the alkoxy amine linkage can be cleaved allowing the polymer chain to become active and continue to grow. Thus, equilibrium between active and dormant polymer chains can be controlled though the selection of the temperature range that is used for polymerization. The temperature range is typically in the range of 100° C. to 160° C. The resulting polymeric material tends to have a relatively narrow molecular weight distribution.

Nitroxide mediating agents are often used for the polymerization of monomers such as styrene. When a nitroxide compound is used, one end of the polymeric material is often a group derived from the initiator and the other end can be the nitroxide compound. At least one of these is typically selected to provide acid functionality (e.g., a carboxyl group). For example, if the initiator is 4,4'-azobis(4-cyanovaleric acid) and the nitroxide mediating agent TEMPO are used, one end of the polymer is usually the group —NH—C(CN)(CH₃)—CH₂—CH₂—COOH. In this example, the carboxyl group is provided by the initiator.

In some cases the nitroxide mediating agent and the initiating species can be obtained from one compound. For example, some alkoxyamine compounds can decompose at a particular temperature to yield both an initiating radical and a nitroxide radical. Such an initiator is described in an article by Messerschmidt et al. (*Macromolecules*, 41 (2008)). The initiating species from the decomposed alkoxyamine also may have a carboxyl group, leaving the generated polymeric group with a carboxyl group at one end of the chain. The other end of the chain is capped with the nitroxide portion of the decomposed alkoxyamine compound. One such compound described in articles by Leenen et al. (e-Polymers, number 71 (2005)) and Dufils et al. (*Polymer*, 48 (2007)), is 2-methyl-2-(N-tert-butyl-N-(1'diethylphosphono-2,2'-dimethylpropyl)aminoxyl)propanoic acid, which was obtained from Arkema (Philadelphia, Pa.).

As used herein, the term "polydispersity" or "polydispersity index" is a measure of the molecular weight distribution and refers to the weight average molecular weight (Mw) divided by the number average molecular weight (Mn) of the polymer. Polymeric materials that are all of the same molecular weight have a polydispersity of 1.0 while polymeric materials that have more than one molecular weight have a polydispersity greater than 1.0. The polydispersity can be determined, for example, using gel permeation chromatography. The polydispersity index is typically less than 10.0, less than 5.0, less than 2.0, less than 1.5, less than 1.4, less than 1.3, less than 1.2, or less than 1.1. When a nitroxide mediating agent is used, the polydispersity index is often in the range of 1.0 to 1.4, in the range of 1.0 to 1.3, or in the range of 1.0 to 1.2. If a non-living polymerization method is used such as when a traditional chain transfer agent is used in place of a nitroxide mediated agent, the polydispersity index is often in the range of 1.5 to 10.0, in the range of 1.5 to 6.0, in the range of 1.5 to 4, in the range of 1.5 to 2.0, in the range of 1.5 to 2.0, or in the range of 1.6 to 2.0.

The compounds of Formula (I) can be formed as shown in Reaction Scheme A.

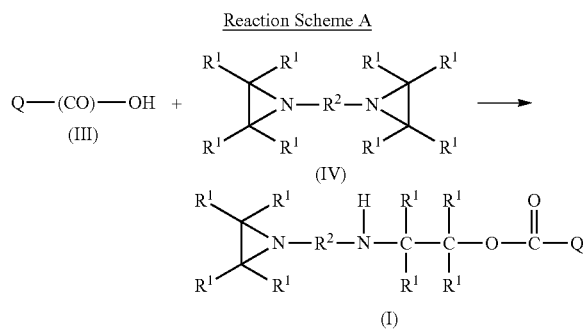

In Reaction Scheme A, the compound of Formula (III) is the carboxyl-terminated polymer. Group Q is a polymeric group that includes a polymerized product of a monomer composition containing at least one ethylenically unsaturated monomer. Group Q is often prepared by free radical or anionic polymerization of the monomer composition. The compound of Formula (IV) is a bis-aziridine compound. The polymeric group Q in Formula (III) and the groups R¹ and R² in Formula (IV) as the same as defined above for Formula (I).

The compound of Formula (III) typically has only one carboxyl group. That is the polymeric group Q usually does not contain a carboxyl group or only a small amount of carboxyl groups. Multiple carboxyl groups in polymeric group Q tend to result in the formation of chemical crosslinks when reacted with the bis-aziridine compound of Formula (IV). However, if the concentration of carboxyl groups is sufficiently low, the likelihood of reaction of these groups with the bis-aziridine compound can be minimized. That is, low levels of carboxyl groups in group Q can be used.

Reaction Scheme A typically uses a molar excess of aziridinyl groups in the bis-aziridine compound of Formula (IV) to acid groups in the compound of Formula (III). The number of moles of aziridinyl groups is often at least 2 times, at least 2.5.times, at least 3 times, at least 3.5 times, or at least 4 times the number of moles of acid groups. This excess tends to minimize the reaction of both of the aziridinyl groups in the bis-aziridine compound with the carboxyl-terminated polymer of Formula (III). The reaction results in the ring opening of one but not both of the aziridinyl rings. The desired product of Formula (I) has an aziridinyl group that has not been ring opened by reaction with the carboxyl-terminated polymer of Formula (III).

Reaction Scheme A typically can occur at room temperature in the presence of a solvent that is miscible with the polymers of Formula (III) and the bis-aziridine compounds of Formula (IV). Suitable solvents for the preparation of the compound of Formula (I) include, but are not limited to, toluene, xylenes, ethyl acetate, and methyl ethyl ketone. The resulting aziridinyl-terminated polymer of Formula (I) is then precipitated by the addition of a large amount of solvent that is immiscible with the aziridinyl-terminated polymer. The volume of solvent is often at least 5 times, at least 6 times, at least 8 times, or at least 10 times the volume of the product solution. Suitable solvents for precipitation of the product (i.e., compound of Formula (I)) include, but are not limited to, methanol. The precipitated polymeric material can then be filtered and dried. The percent yield is often greater than 85 percent, greater than 90 percent, greater than 92 percent, or greater than 95 percent.

Reaction Scheme A provides a flexible method for preparing the compounds of Formula (I). The formation of the intermediate carboxyl-containing compound Q-(CO)OH using a free radical polymerization reaction allows great flexibility in the selection of monomers used to form the polymeric group Q.

Once formed, the compounds of Formula (I) can be reacted with a second compound that has an acidic group. Such a reaction can result in the formation of an attachment group that connects a first polymeric group to the second compound. More specifically, the attachment group results from the reaction of the aziridinyl group of the compound of Formula (I) with the acidic group on the second compound. In many embodiments, the second compound is a polymeric material having one or more carboxyl groups. This reaction can be used, for example, to graft polymeric group Q onto the second compound.

One example use of the compound of Formula (I) is shown in Reaction Scheme B. In this reaction scheme, the compound of Formula (I) is reacted with an carboxyl-containing compound G-(CO)OH. The group G can be any suitable organic group and is often a polymeric group.

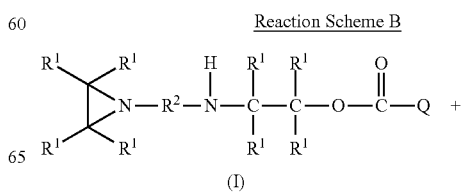

-continued

G—(CO)OH →

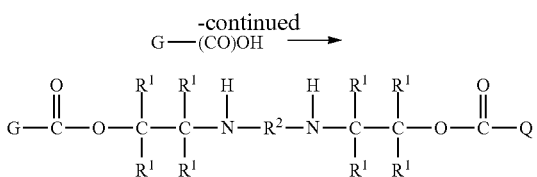

Although the carboxyl-containing compound of formula G-(CO)OH is shown in this reaction scheme with only one carboxyl group for ease of explanation, this compound can have any suitable number of carboxyl group. That is, the final product can include multiple groups of formula —(CO)OC$(R^1)_2C(R^1)_2$NH—$R^2$—NH—$C(R^1)_2C(R^1)_2$—O(CO)—.

Various items are provided that are compounds or methods of making compounds. The compounds have both a polymeric group Q and an aziridinyl group.

Item 1 is a compound of Formula (I)

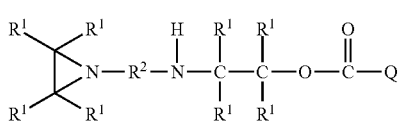

In Formula (I), each $R^1$ is independently hydrogen or an alkyl. Group $R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof. Group $R^3$ is hydrogen or an alkyl. Group Q is a polymeric group comprising a product of polymerization of a monomer composition comprising at least one ethylenically unsaturated monomer.

Item 2 is a version of item 1, wherein the group Q has a weight average molecular weight equal to at least 5000 grams/mole.

Item 3 is a version of item 1 or 2, wherein the compound has a glass transition temperature equal to at least 20° C.

Item 4 is a version of items of any one of items 1 to 3. In item 4, group Q is formed by a free radical polymerization reaction or an anionic polymerization reaction.

Item 5 is a version of any one of items 1 to 4. In item 5, the monomer composition comprises a vinyl aryl monomer, vinyl heterocyclic monomer, or a combination thereof.

Item 6 is a version of item 5, wherein the monomer composition comprises styrene, alpha-methyl styrene, or an alkyl substituted styrene.

Item 7 is a version of any one of items 1 to 4, wherein the monomer composition comprises a (meth)acrylate ester, (meth)acrylamide, or a combination thereof.

Item 8 is a version of item 7, wherein the (meth)acrylate comprises methyl methacrylate, ethyl methacrylate, cycloalkyl (meth)acrylate, bicyclic (meth)acrylate, aryl (meth)acrylate, aryloxyalky (meth)acrylate, or a combination thereof.

Item 9 is a version of any one of items 1 to 8, wherein the group Q is a homopolymer.

Item 10 is a version of any one of items 1 to 8, wherein group Q is a random copolymer.

Item 11 is a version of item 10, wherein the random copolymer is formed from a monomer composition comprising a vinyl aryl monomer and a vinyl heterocyclic monomer.

Item 12 is a version of item 11, wherein the vinyl aryl monomer is styrene and the vinyl heterocyclic monomer is 4-vinylpyridine.

Item 13 is a version of any one of items 1 to 8, wherein the group Q is block copolymer.

Item 14 is a version of any one of items 1 to 8, wherein the group Q is a diblock copolymer.

Item 15 is a version of item 14, wherein the diblock copolymer comprises a first block of poly(vinyl aryl monomer) and a second block of poly(vinyl heterocylic monomer).

Item 16 is a version of item 15, wherein the poly(vinyl aryl monomer) is polystyrene and the poly(vinyl heterocyclic monomer) is poly(4-vinylpyridine).

Item 17 is a version of any one of items 1 to 16, wherein the compound of Formula (I) is a compound of Formula (Ia).

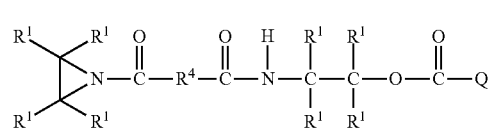

In Formula (Ia), $R^4$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof.

Item 18 is a version of item 17, wherein $R^4$ is an alkylene.

Item 19 is a version of item 17, wherein the compound of Formula (Ia) is a compound of Formula (Ib).

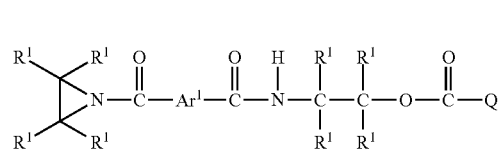

The group $Ar^1$ is an arylene.

Item 20 is a version of item 19, wherein $Ar^1$ is phenylene.

Item 21 is a version of item 17, wherein the compound of Formula (Ia) is a compound of Formula (Id).

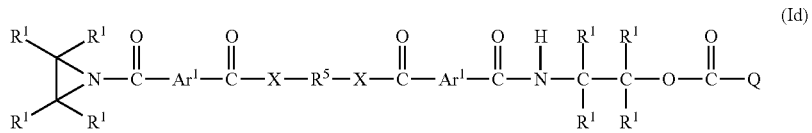

In Formula (Id), each group $Ar^1$ is an arylene. Each group X is oxy or $-NR^3-$. Group $R^5$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

Item 22 is a version of item 21, wherein $Ar^1$ is phenylene and each X is oxy.

Item 23 is a version of item 21 or 22, wherein $R^5$ is an alkylene or heteroalkylene and X is oxy.

Item 24 is a version of item 17, wherein the compound of Formula (Ia) is a compound of Formula (If).

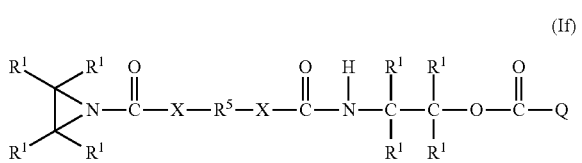

In Formula (If), $R^5$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

Item 25 is a version of item 24, wherein $R^5$ is an alkylene and X is $-NR^3-$.

Item 26 is a version of any one of items 1 to 16, wherein the compound of Formula (I) is a compound of Formula (Ig).

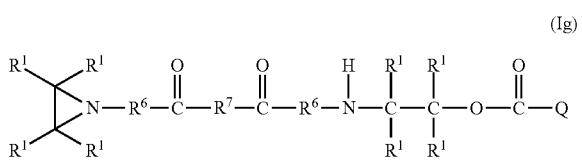

In Formula (Ig), each $R^6$ is independently an alkylene. Group $R^7$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

Item 27 is a version of item 26, wherein the compound of Formula (Ig) is a compound of Formula (Ih).

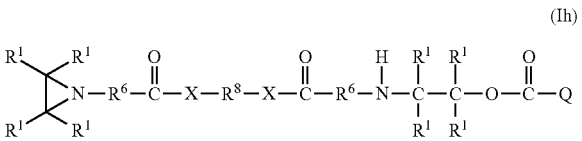

In Formula (Ih), each group X is independently oxy or $-NR^3-$. Group $R^8$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

Item 28 is a method of making a compound of Formula (I).

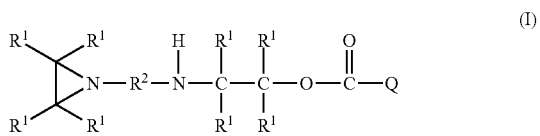

The method includes providing a carboxyl-terminated polymer of Formula (III).

$$Q-(CO)-OH \quad (III)$$

In Formula (III), Q is a polymeric group comprising a product of polymerization of a monomer composition comprising at least one ethylenically unsaturated monomer. The method further includes reacting the carboxyl-terminated polymer with a bis-aziridine compound of Formula (IV).

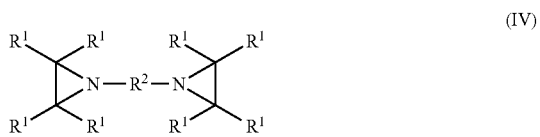

In Formula (IV), each $R^1$ is independently hydrogen or an alkyl. Group $R^2$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof. Group $R^3$ is hydrogen or an alkyl.

Item 29 is a version of item 28, wherein the carboxyl-terminated polymer has a weight average molecular weight equal to at least 5000 grams/mole.

Item 30 is a version of item 28 or 29, wherein the carboxyl-terminated polymer has a glass transition temperature equal to at least 20° C.

Item 31 is a version of any one of items 28 to 30, wherein the carboxyl-terminated polymer is formed by a free radical polymerization reaction or an anionic polymerization reaction.

Item 32 is a version of item 31, wherein the carboxyl group of the carboxyl-terminated polymer is formed from an initiator, chain transfer agent, or nitroxide meditating agent used in the free radical polymerization reaction or the anionic polymerization reaction.

EXAMPLES

All percents are based on weight unless otherwise indicated.

The materials used in the following examples were purchased from Alfa Aesar (Ward Hill, Mass.) or Sigma-Aldrich Company (St. Louis, Mo.) unless otherwise stated.

Inhibitor removal from the monomers was done by passing the monomers slowly through a column packed with Inhibitor Removal Resin (CAS #9003-70-7) from Alpha Aesar (Ward Hill, Mass.). Monomers treated in this manner are referred to as "treated monomers".

Test Method: Molecular Weight Distribution

The molecular weight distribution of the compounds was characterization using conventional gel permeation chromatography (GPC). GPC instrumentation included a high pressure liquid chromatography pump (Model 1515 HPLC pump from Waters Corporation (Milford, Mass.)), an autosampler (Model 717 from Waters Corporation), a UV detector (Model 2487 from Waters Corporation), and a refractive index detector (Model 2410 from Waters Corporation). The chromatograph was equipped with two PLgel 5 micron MIXED-D columns that are available from Varian Inc. (Palo Alto, Calif.).

Samples of polymeric solutions were prepared by dissolving polymer or dried polymer samples in tetrahydrofuran at a concentration of 0.5 percent (weight/volume) and by filtering through a 0.2 micron polytetrafluoroethylene filter (commercially available from VWR International (West Chester, Pa.)).

The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity (weight average molecular weight divided by number average molecular weight) were calculated for each sample against this standard calibration curve.

Example 1

An acid terminated (i.e., carboxy-terminated) polystyrene polymer P1 was prepared by adding 100 grams of treated styrene monomer to a 500 mL flask along with 2.34 grams of 4,4' azobis (4-cyanovaleric acid) (ABCVA) initiator, 0.85 grams of 2,2,6,6-tetramethyl-1-piperidinyloxy (TEMPO), and a magnetic stir bar. The flask was sealed with a rubber septum, mixed well, and bubbled with nitrogen for 20 minutes. The flask was then transferred to an oil bath at 135° C. and held at that temperature for 10 hours. During the reaction, the initially red monomer formulation changed to a light yellowish color. The product was then allowed to cool and was slowly added to a 6 to 10 fold volume excess of cold methanol. The precipitated polymer was collected and dried overnight under vacuum at room temperature. The weight average molecular weight (Mw) based on GPC analysis was 15,000 grams/mole with a polydispersity index (PDI) of 1.08.

This polymerization reaction is shown in Reaction Scheme C.

An aziridine terminated polystyrene polymer was prepared by reacting polymer P1 with an excess of a difunctional aziridine. Specifically, 50 grams of P1 was dissolved in 120 grams of a solution of 5 weight percent 1,1'-isophthaloylbis (2-methylaziridine)

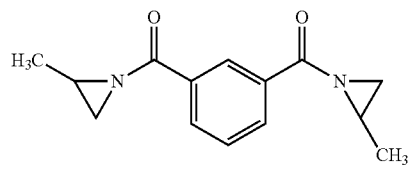

in toluene and the mixture was mixed well for 24 hours. The resulting solution was slowly added to a 6 fold volume excess of cold methanol. The precipitated polymer was collected, dried under vacuum at room temperature, and re-dissolved in toluene. The polymer was precipitated a second time into cold methanol, collected, and dried overnight under vacuum at room temperature to obtain the final product. Based on GPC analysis, the weight average molecular weight (Mw) was 15,300 grams/mole with a polydispersity index of 1.10.

Example 2

Another acid terminated polymer P2 having a Mw of 24,100 grams/mole was prepared using the same method used to prepare P1 but using 2.34 grams of ABCVA and 0.55 grams of TEMPO. The weight average molecular weight of the resulting product according to GPC was 24,150 grams/mole with a polydispersity index (PDI) of 1.15.

An aziridine terminated poly(styrene) polymer was prepared from P2 by following procedure of example 1 using 50 grams of P2 and 60 grams of a 5 weight percent solution of 1,1'-isophthaloylbis(2-methylaziridine) in toluene. Based on GPC analysis, the weight average molecular weight of the resulting product was 24,500 grams/mole with a polydispersity index of 1.17.

Reaction Scheme C

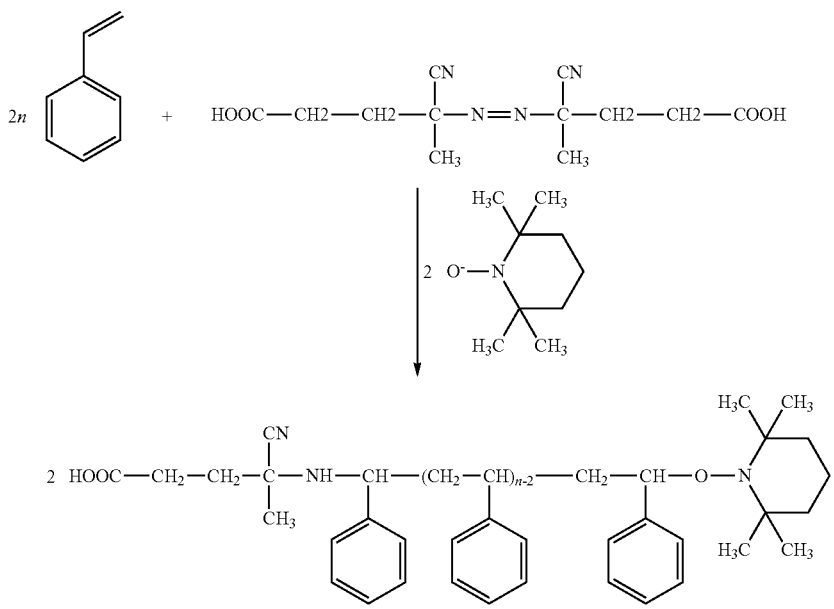

Example 3

An acid terminated poly(benzyl methacrylate) polymer P3 was prepared by adding 100 grams of benzyl methacrylate, 1.17 grams of 3-mercaptopropionic acid (MPA), 0.44 grams of ABCVA (DuPont Company, Wilmington, Del.), and 125 grams of toluene to a narrow necked glass bottle with magnetic stir bar. The formulation was mixed well and bubbled with nitrogen for 20 minutes. The bottle was then sealed and placed in a rotating and heated water bath (commercially available under from Atlas, Inc. (Athens, Ga.) under the trade designation Launder-O-meter) at 70° C. for 20 hours. After cooling, the polymer solution was slowly added to a large excess of cold methanol. The precipitate was collected and dried overnight under vacuum to obtain the final product. Based on GPC analysis, the weight average molecular weight (Mw) was 16,250 grams/mole with a polydispersity index of 1.79.

An aziridine terminated poly(benzyl methacrylate) polymer was prepared from P3 by following the same procedural steps as in Example 1 except that 75 grams of P3 was dissolved in 100 grams of a 5 weight percent solution 1,1'-isophthaloylbis(2-methylaziridine) in toluene. Based on GPC analysis of the final product, the weight average molecular weight (Mw) was 16,700 grams/mole with a polydispersity index of 1.80.

Example 4

Another acid terminated poly(benzyl methacrylate) polymer P4 was prepared following the same method used to prepare polymer P3 but using 100 grams of benzyl methacrylate, 0.44 grams of ABCVA, and 0.6 grams of MPA. Based on GPC analysis, the weight average molecular weight of the resulting carboxyl-terminated polymer has a Mw of 28,000 grams/mole with a polydispersity index (PDI) of 1.85.

An aziridine terminated poly(benzyl methacrylate) polymer of P4 was prepared following the same procedural steps as in Example 1 except that 75 grams of P4 was dissolved in 50 grams of a 5 weight percent solution of 1,1'-isophthaloylbis(2-methylaziridine) in toluene. Based on GPC analysis, the final product had a weight average molecular weight (Mw) of 28,400 grams/mole with a polydispersity index of 1.90.

Example 5

An acid terminated poly(methyl methacryalte) polymer P5 was prepared by adding 56 grams of methyl methacrylate to 0.83 grams of MPA, 0.55 grams of ABCVA, and 45 grams of toluene in a narrow necked glass bottle with magnetic stir bar. The formulation was mixed well and then bubbled with nitrogen for 20 min. The bottle was then sealed and placed in a rotating and heated water bath at 70° C. for 20 hours. After cooling, the polymer solution was slowly added to a large excess of cold methanol. The precipitate was collected and dried overnight under vacuum. Based on GPC analysis, the weight average molecular weight of the resulting product was 14,850 grams/mole.

An aziridine terminated poly(methyl methacrylate) polymer of P5 was prepared following the same procedural steps as in Example 1 except that 50 grams of P5 was dissolved in 66 grams of a of 5 weight percent solution 1,1'-isophthaloylbis(2-methylaziridine) in toluene. Based on GPC analysis, the final product had a weight average molecular weight (Mw) of 15,100 grams/mole with a polydispersity index of 1.26.

Example 6

Another acid terminated poly(methyl methacrylate) polymer P6 was prepared using the same method used to prepare polymer P5 but using 56 grams of methyl methacrylate, 0.55 grams of ABCVA, 0.5 grams of MPA, and 45 grams of toluene. Based on GPC analysis, the weight average molecular weight of the resulting product was 23,650 grams/mole.

An aziridine terminated poly(methyl methacrylate) polymer of P6 was prepared following the same procedural steps as in Example 1 except that 55 grams of P6 was dissolved in 50 grams of a solution of 5 weight percent 1,1'-isophthaloylbis(2-methylaziridine) in toluene. Based on GPC analysis, the final product had a weight average molecular weight of 24,300 grams/mole with a polydispersity index of 1.36.

Example 7

An acid terminated poly(isobornyl acrylate-benzyl methacrylate) copolymer P7 was prepared by adding 25 grams of isobornyl acrylate, 25 grams of benzyl methacrylate, 0.4 grams of MPA, 0.15 grams of VAZO 67 ((2,2'-azobis(2-methylbutyronitrile) from DuPont Company (Wilmington, Del.)), and 50 grams of toluene to a narrow necked glass bottle with magnetic stir bar. The formulation was mixed well and bubbled with nitrogen for 20 min. The bottle was then sealed and placed in a rotating and heated water bath at 70° C. for 20 hours. After cooling, the polymer solution was slowly added to a large excess of cold methanol. The precipitate was collected and dried overnight under vacuum. Based on GPC analysis, the resulting copolymer had a weight average molecular weight of 14,900 grams/mole with a polydispersity index of 1.51.

An aziridine terminated poly(isobornyl acrylate-benzyl methacrylate) polymer of copolymer P7 was prepared following the same procedural steps as in Example 1 except that 66 grams of copolymer P7 was dissolved in 40 grams of a 5 weight percent solution of 1,1'-isophthaloylbis(2-methylaziridine) in toluene. Based on GPC analysis of the final product, the weight average molecular weight was 15,250 grams/mole with a polydispersity index of 1.56.

Example 8

An acid terminated poly(styrene-co-vinyl pyridine) copolymer P8 was prepared by adding 45 grams of treated styrene monomer and 5 grams of treated vinyl pyridine monomer, 0.7 grams of ABCVA, and 0.383 grams of TEMPO to a 250 ml flask with a magnetic stir bar. The flask was sealed with rubber septa, mixed well, and bubbled with nitrogen for 20 minutes. The flask was then transferred to an oil bath at 135° C. and held at that temperature for 10 hours. During the reaction, the initially red monomer formulation changed to a light yellowish color. The product was then allowed to cool and was slowly added to a large excess of cold methanol. The precipitated copolymer was collected and dried overnight in a vacuum oven. Based on GPC analysis, the weight average molecular weight of the resulting product was 18,880 grams/mole with a polydispersity index of 1.56.

An aziridine terminated poly(styrene-co-vinyl pyridine) polymer of random copolymer P8 was prepared following the same procedural steps as in Example 1 except that 50 grams of P8 was dissolved in 40 grams of a 5 weight percent solution of 1,1'-isophthalaylbis(2-methylaziridine) in toluene. Based on GPC analysis, the weight average molecular weight of the resulting product was 18,250 grams/mole with a polydispersity index of 1.28.

Example 9

An acid terminated poly(styrene-co-vinyl pyridine) copolymer P9 with each co-monomer segregated into a discrete portion of the copolymer (i.e., block copolymer with two blocks) was prepared by adding 45 grams of treated styrene monomer to a 250 ml flask along with 0.7 grams of ABCVA, 0.383 grams of TEMPO and a magnetic stir bar. The flask was sealed with rubber septa, mixed well, and bubbled with nitrogen for 20 minutes. The flask was then transferred to an oil bath at 135° C. and held at that temperature for 8 hours. During the reaction, the initially red monomer formulation changed to a light yellowish color.

After 8 hours, 5 grams of vinyl pyridine kept under nitrogen atmosphere for five minutes, was then transferred to the polystyrene reaction flask using a syringe and the reaction temperature of 135° C. was held for an additional 5 hours. The reaction product was then allowed to cool and was slowly added to a large volume excess of cold methanol. The precipitated polymer was filtered, collected, and dried overnight in a vacuum oven. Based on GPC analysis, the weight average molecular weight of the resulting product was 15,400 grams/mole with a polydispersity index of 1.31.

An aziridine terminated poly(styrene-co-vinyl pyridine) polymer of block copolymer P9 was prepared following the same procedural steps as in Example 1 except that 40 grams of the acid functional polymer from P9 was dissolved in 35 grams of a 5 weight percent solution of 1,1'-isophthaloylbis (2-methylaziridine) in toluene. Based on GPC analysis, the weight average molecular weight of the resulting product was 16,110 grams/mole with a polydispersity index of 1.25.

Example 10

2-Methyl aziridine (15.05 grams, 0.26 moles) was added drop wise over one hour to a solution of 1,6-diisocyanatohexane (20.00 grams, 0.12 moles, Aldrich) in toluene (40 mL) while cooling in an ice bath. After stirring for a total of 24 hours at room temperature, a portion of the solvent was removed under vacuum to give N,N'-(hexane-1,6-diyl)bis-(2-methylaziridine-1-carboxamide)

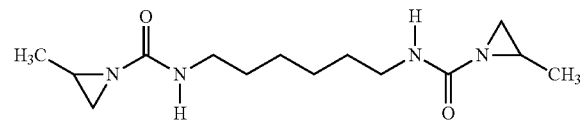

as a colorless oil (45.76 grams, concentration of 70 weight percent in toluene).

An acid terminated polystyrene polymer P10 was prepared by adding 300 grams of treated styrene monomer to a 1000 mL flask along with 8 grams ABCVA, 2.5 grams of TEMPO, and 80 grams of xylene. The flask was placed in a controlled temperature oil bath, fitted with a condenser and a mechanical stir blade, mixed well, and bubbled with nitrogen for 20 minutes. The oil bath temperature was then raised to and maintained at 140° C. for 12 hours. During the reaction, the initially red monomer formulation changed to a light yellowish color. The flask was cooled and 200 grams of toluene was then added to the flask to dissolve the viscous polymer solution. The acid functional polystyrene polymer P10 was then precipitated using methanol, dried, and re-dissolved into tetrahydrofuran at 50 weight percent solids. H-NMR analysis indicated a styrene conversion of approximately 78 percent.

Based on GPC analysis, the weight average molecular weight of the resulting product was 17,350 grams/mole with a polydispersity index of 1.29.

The 50 weight percent acid functional polymer solution (P10, 55 grams) was then mixed in a jar with 5 grams of the 70 weight percent N,N'-(hexane-1,6-diyl)bis-(2-methylaziridine-1-carboxamide) solution for 12 hours and then precipitated into cold methanol. The resulting solids were filtered and dried overnight under vacuum at room temperature to obtain the functionalized polymer at a 97 percent yield.

Example 11

HDODA (hexanediol diacrylate, 20.00 grams, 0.09 moles) that was obtained from Cytek, Inc. (Woodland Park, N.J.) and 2-methyl aziridine (15.07 grams, 0.26 moles) were stirred at room temperature overnight. The mixture was placed under vacuum with stirring for 1.5 hours to give the product (3-Aziridin-1-yl-propionic acid 2-(3-aziridin-1-yl-propionyloxy)-hexyl ester)

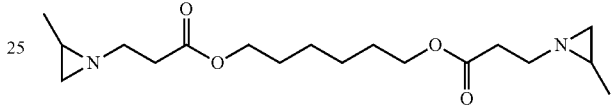

as a colorless oil (29.82 grams).

The acid functional polystyrene polymer solution (P10, 75 grams of the 50 percent polymer solution) was then mixed in a jar with 9 grams of the (3-Aziridin-1-yl-propionic acid 2-(3-aziridin-1-yl-propionyloxy)-hexyl ester) compound for 12 hours and then precipitated into cold methanol. The resulting solids were filtered and dried overnight under vacuum to obtain the functionalized polymer at a 95 percent yield.

Example 12

Isophthaloyl dichloride (1950 grams, 9.60 moles) was added to a 3 L, three-neck, round bottom flask equipped with a magnetic stirrer, a thermometer, and a bubbler. The flask was heated at 55° C. Then 1,10-decanediol (112 grams, 0.64 moles) was added to the flask in portions. After stirring the reaction mixture at 55° C. for 1 hour, the excess isophthaloyl dichloride was removed by vacuum distillation (200 mTorr, 100° C.) and was recycled. A stream of dry nitrogen was bubbled through the mixture while distilling so that the isophthaloyl dichloride residue could be removed completely. The product, which was a white solid (311 grams), was 1,10-decanediol bis(3-chlorocarbonylbenzoic acid) ester.

An aqueous NaOH solution (563 grams of a 10.0 weight percent solution), toluene (500 mL), and 2-methylaziridine (89.3 grams of 90 percent pure 2-methylaziridine, 1.41 moles) was added to a 3 L, three-neck, round bottom flask equipped with a magnetic stirrer, a thermometer, and an addition funnel. The mixture was stirred and cooled in the range of −10° C. to −5° C. To this stirred mixture was added a solution of 1,10-decanediol bis(3-chlorocarbonylbenzoic acid) ester (311 grams) in toluene (500 mL) over a period of 30 minutes. When addition was complete, the mixture was stirred at room temperature overnight. The organic phase was then washed with water, dried over magnesium sulfate ($MgSO_4$), filtered and concentrated under vacuum at room temperature. The product was 331.5 grams of 1,10-decanediol bis(3-(2-methylaziridine-1-carbonyl)benzoic acid) ester

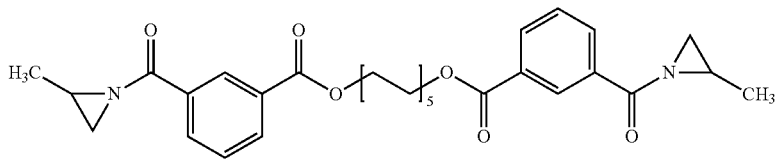

as a pale yellow oil. A 15 weight percent solution of this material in toluene was then prepared.

The acid functional polymer solution (P10, 25 grams) was then mixed in a jar with 23 grams of the 15 weight percent 1,10-decanediol bis(3-(2-methylaziridine-1-carbonyl)benzoic acid) ester solution for 12 hours and then precipitated into cold methanol. The resulting solids were filtered and dried overnight under vacuum to obtain the functionalized polymer at a 98 percent yield.

Example 13

Isophthaloyl dichloride (812 grams, 4.0 moles) was added to a 1 L, three-neck, round bottom flask equipped with a magnetic stirrer, thermometer, and an adapter. The flask was heated at 100° C. To this flask was added poly(ethylene glycol)1000 (158 grams, 0.16 mole, weight average molecular weight of about 1000 grams/mole) in 25 portions. After stirring the reaction mixture at 100° C. for 1 hour, the excess of isophthaloyl dichloride was removed by vacuum distillation (200 mTorr, 100° C.) and was recycled. A stream of dry nitrogen was bubbled through the mixture while distilling so the isophthaloyl dichloride residue could be removed completely. A pale yellow liquid (210 grams), poly(ethylene glycol)1000 bis(3-chlorocarbonylbenzoic acid) was obtained as product.

Triethylamine (35.1 grams, 0.35 moles), 2-methylaziridine (22.0 grams of 90 percent pure 2-methylaziridine, 0.35 moles), and $CH_2Cl_2$ (250 mL) was added a 1 L, three-neck, round bottom flask equipped with a magnetic stirrer, a thermometer, and an addition funnel. The mixture was stirred and cooled to −10° C. A solution of poly(ethylene glycol)1000 bis(3-chlorocarbonylbenzoic acid) ester (210 grams) in $CH_2Cl_2$ (250 mL) was added over a period of 60 minutes. The mixture was allowed to stir at room temperature for 110 hours, after which a white precipitate was removed by filtration. The filtrate was concentrated under high vacuum at room temperature to give 203 grams of (poly(ethylene glycol)1000 bis(3-(2-methylaziridine-1-carbonyl)benzoic acid) ester as a pale yellow liquid. A 40 weight percent solution of this material in toluene was then prepared.

The acid functional polymer solution (P10, 20 grams) was then mixed in a jar with 24 grams of the (poly(ethylene glycol) 1000 bis(3-(2-methylaziridine-1-carbonyl)benzoic acid) solution for 12 hours and then precipitated into cold methanol. The resulting solids were filtered and dried overnight under vacuum to obtain the functionalized polymer at a 92 percent yield.

What is claimed is:
1. A compound of Formula (I)

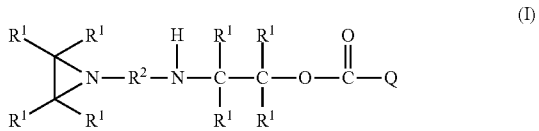

(I)

wherein
each $R^1$ is independently hydrogen or an alkyl;
$R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof;

$R^3$ is hydrogen or an alkyl; and

Q is a polymeric group comprising a product of polymerization of a monomer composition comprising at least one ethylenically unsaturated monomer, wherein Q is free of a carboxyl group.

2. The compound of claim 1, wherein the group Q has a weight average molecular weight equal to at least 5000 grams/mole.

3. The compound of claim 1, wherein the compound has a glass transition temperature equal to at least 20° C.

4. The compound of claim 1, wherein the monomer composition comprises a vinyl aryl monomer, vinyl heterocyclic monomer, or a combination thereof.

5. The compound of claim 1, wherein the monomer composition comprises a (meth)acrylate ester, (meth)acrylamide, or a combination thereof.

6. The compound of claim 1, wherein the group Q is a homopolymer.

7. The compound of claim 1, wherein group Q is a random copolymer.

8. The compound of claim 1, wherein the group Q is block copolymer.

9. The compound of claim 1, wherein the compound of Formula (I) is a compound of Formula (Ia)

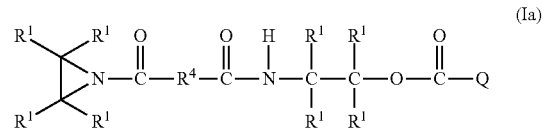

(Ia)

wherein
$R^4$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof.

10. The compound of claim 9, wherein the compound of Formula (Ia) is a compound of Formula (Ib)

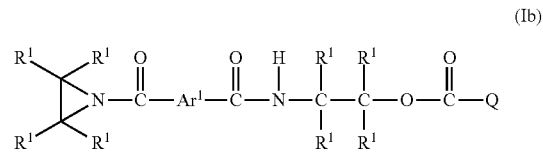

(Ib)

wherein $Ar^1$ is an arylene.

11. The compound of claim 9, wherein the compound of Formula (Ia) is a compound of Formula (Id)

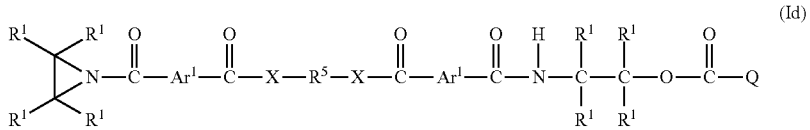

(Id)

wherein
    each group $Ar^1$ is an arylene;
    each group X is oxy or $-NR^3-$; and
    $R^5$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

12. The compound of claim 9, wherein the compound of Formula (Ia) is a compound of (If)

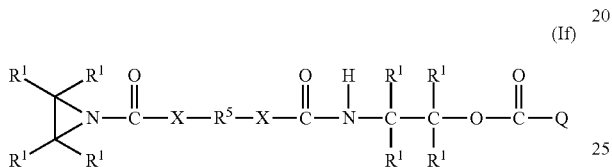

(If)

wherein
    $R^5$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

13. The compound of claim 1, wherein the compound of Formula (I) is a compound of Formula (Ig)

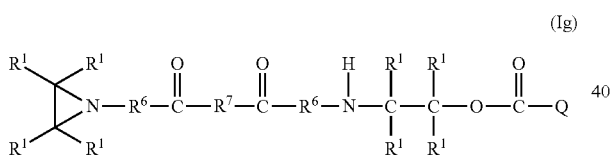

(Ig)

wherein
    each $R^6$ is independently an alkylene; and
    $R^7$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

14. The compound of claim 13, wherein the compound of Formula (Ig) is a compound of Formula (Ih)

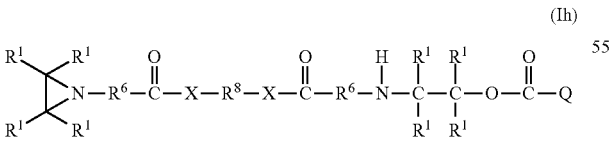

(Ih)

wherein
    each group X is independently oxy or $-NR^3-$;
    $R^8$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof.

15. A method of making a compound of Formula (I)

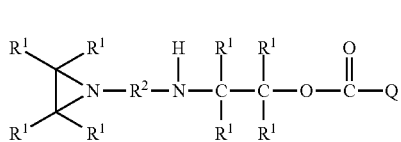

(I)

the method comprising:

a) providing a carboxyl-terminated polymer of Formula (III)

Q-(CO)—OH    (III)

wherein
    Q is a polymeric group comprising a product of polymerization of a monomer composition comprising at least one ethylenically unsaturated monomer, wherein Q is free of a carboxyl group; and b) reacting the carboxyl-terminated polymer with a bis-aziridine compound of Formula (IV)

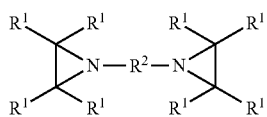

(IV)

wherein
    each $R^1$ is independently hydrogen or an alkyl;
    $R^2$ is a divalent group comprising an alkylene, heteroalkylene, arylene, heteroarylene, or a combination thereof and optionally further comprising an oxy, carbonyl, carbonyloxy, carbonylimino, $-NR^3-$, or a combination thereof; and
    $R^3$ is hydrogen or an alkyl.

\* \* \* \* \*

UNITED STATES PATENT AND TRADEMARK OFFICE
CERTIFICATE OF CORRECTION

PATENT NO. : 8,779,068 B2
APPLICATION NO. : 13/703230
DATED : July 15, 2014
INVENTOR(S) : Clapper It is certified that error appears in the above-identified patent and that said Letters Patent is hereby corrected as shown below:

On the Title Page, Column 2, Item [56]
Line 9, delete "tetramethy1" and insert -- tetramethyl --, therefor.

In the Specification
Column 2
Line 67, delete "bicylic," and insert -- bicyclic, --, therefor.

Column 4
Line 37, delete "azirdinyl" and insert -- aziridinyl --, therefor.

Line 40, delete "azridinyl" and insert -- aziridinyl --, therefor.

Line 62, delete "alkyene," and insert -- alkylene, --, therefor.

Column 5
Line 65, delete "alkyene," and insert -- alkylene, --, therefor.

Column 8
Line 26, delete "alkyene," and insert -- alkylene, --, therefor.

Column 10
Line 41, delete "hydroxylbutyl" and insert -- hydroxybutyl --, therefor.

Column 11
Lines 14-15, delete "dimethylstytrene," and insert -- dimethylstyrene, --, therefor.

Line 20, delete "vinylcarpolactam" and insert -- vinylcaprolactam --, therefor.

Line 22, delete "proprionate" and insert -- propionate --, therefor.

Signed and Sealed this
Eleventh Day of November, 2014

Michelle K. Lee
*Deputy Director of the United States Patent and Trademark Office*

Line 33, delete "heterocylic" and insert -- heterocyclic --, therefor.

Column 16
Line 22, delete "heterocylic" and insert -- heterocyclic --, therefor.

Column 21
Line 48, delete "methacryalte)" and insert -- methacrylate) --, therefor.

Line 63, delete "of a of" and insert -- of a --, therefor.

Column 22
Line 64, delete "isophthalaylbis" and insert -- isophthaloylbis --, therefor.

Column 25
Line 35, delete "methylaziridne," and insert -- methylaziridine, --, therefor.

Line 49, delete "ajar" and insert -- a jar --, therefor.